United States Patent [19]

Greten

[11] 4,045,531

[45] Aug. 30, 1977

[54] PROCESS FOR THE PRODUCTION OF CHIPBOARDS AND THE LIKE

[75] Inventor: Berndt Greten, Springe, Deister, Germany

[73] Assignee: bison-Werke Bahre & Greten GmbH & Co. KG, Germany

[21] Appl. No.: 589,693

[22] Filed: June 24, 1975

[30] Foreign Application Priority Data

June 28, 1974 Germany ............................ 2431180

[51] Int. Cl.$^2$ ............................................ B29J 5/00

[52] U.S. Cl. .................................... 264/113; 264/120; 264/121; 264/122

[58] Field of Search ................ 264/120, 121, 122, 113

[56] References Cited

U.S. PATENT DOCUMENTS

| | | | |
|---|---|---|---|
| 2,757,115 | 7/1956 | Heritage | 264/121 |
| 3,630,456 | 12/1971 | Mark | 264/121 |
| 3,873,662 | 3/1975 | Cartlidge | 264/121 |
| 3,880,975 | 4/1975 | Lundmark | 264/121 |

*Primary Examiner*—Robert F. White
*Assistant Examiner*—James R. Hall, Jr.
*Attorney, Agent, or Firm*—Craig & Antonelli

[57] ABSTRACT

The temperature distribution through the thickness of a layer of particulate matter formed by air screening and by compressing in a press for forming a particle board therefrom is made more nearly uniform by heating the air stream or air streams used for the air screening of the particulate matter.

10 Claims, No Drawings

PROCESS FOR THE PRODUCTION OF CHIPBOARDS AND THE LIKE

BACKGROUND OF THE INVENTION

The present invention relates to a process for the manufacture of chipboards or particle boards by the formation of a layer made up of chips or particles intermingled with heat actuated or curable binders, these particles being, those conventionally used in the formation of such particle boards, by means of air screening, prepressing, and subsequent pressing of the layer with heating in a press, such as a single-layer press, a continuously operating press, or the like.

Devices to carry out such processes are conventional. In the apparatus disclosed by German Utility Model No. 7,140,379, chip-like and/or fibrous particles mixed with binders are conveyed through a heated press on a chip layer carrier moving in an operating rhythm, these particles being spread on the layer carrier, while the latter is at rest and the press is closed, by means of a spreading device arranged above the layer carrier, which can be reciprocated for the formation of a chip layer. This apparatus also comprises a device for subdividing the thus-formed layer into sections to be pressed.

Upstream of the heated press in this apparatus, a prepress is arranged for preliminary compression of the chip layer sections formed on the layer carrier, and this prepress is fashioned to be heatable. With such a construction, the preliminarily compressed layer is heated, for example, downstream of the prepress to such an extent that the upper cover and the intermediate layers are normally at a temperature of about 53° to 55° C., the central or core layer is normally at a temperature of about 40° to 43° C., and the lower cover and intermediate layers are normally at a temperature of about 74° to 76° C.

The relatively minor heating of the central or core layer of the prepressed product is a hindrance to shortening the time required for the pressing operation in the downstream single-layer heating and finishing press.

Although the central or core layer could be exposed to high frequency heating, this step is economical only in the case of boards having a thickness of about 15 mm. In addition, manufacturing costs as well as operating expenses are considerably increased by the use of high-frequency supply sources. Thus, high frequency heating is not used in practice for heating the central layer material.

SUMMARY OF THE INVENTION

The present invention is based on the problem of further developing processes of the type mentioned above so that not only the prepressing step but also the finishing pressing step can be shortened, i.e. so that the manufacturing time can be reduced.

In order to solve theis problem, the present invention proposes to heat the air streams serving for the air screening of the particles forming the chipboard or particle board to a temperature lying beneath and/or close to the curing on activator temperature of the binder. It is thereby possible to raise the temperature of the layer components to such an extent that in certain cases it is not even necessary to heat the prepress arranged upstream of a single-layer finishing press.

The maximum temperature of the air streams must be limited to avoid curing of the binders prior to the pressing step.

Of course, the prepress can also be heated, if this seems necessary to prevent an excessive heating up of the screening air streams.

Thus, the present invention provides a process for forming a particle board in which the particles intermingled with a binder are deposited by air screening onto a support to form a particle layer and the particle layer so formed is compressed in a press to form the particle board, the air stream used for air screening being heated to temperatures close to the curing or activation temperature of the binder so that the temperature distribution of the particulate matter in the layer is made more nearly uniform.

More specifically, the present invention provides a process for the production of chipboards or particle boards by the formation of a chip layer made up of particles intermingled with binders, these particles being those conventionally used, by means of air screening, prepressing, the subsequent pressing of the layer with heating in a single-layer press, the air streams serving for air screening of the particles being heated to a temperature lying beneath and/or close to the curing or activation temperature of the binder.

Detailed Description

Depending on the composition of the binder utilized, it is advantageous to heat the screening air streams to about 100° C. A premature curing of the binder-covered fine and extremely fine particles need not be feared, even at temperatures lying above 100° C., if the particle-binder mixture contains appropriate additions of buffers, such as, for example, ammonium hydroxide or the like. Normally, it is sufficient to heat the screening air to at least 70° C, preferably 70–80° C. so that all components of the chip layer to be compressed reach, for example, at least a temperature of about 50°–55° C. This temperature is then maintained in the central or core layer of the thus-formed chip layer until the beginning of the layer pressing operation, this being due to the fact that the two cover and intermediate layers of the chip layer serve as heat buffers. Although a certain portion of the heat introduced into the cover and intermediate layers during the screening step is lost during the transportation of the chip layer, namely by heat exchange with the surrounding air and/or with the chip layer carrier, this heat loss is relatively minor. To achieve a uniform effect in this connection, the air stream fed into the air screening step for finer and extremely fine particles can have a higher temperature than the air stream supplied to the coarser particles intended for the central layer. Thus, it is possible without any difficulties to ensure a uniform temperature characteristic in all strata of the chip layer at the time it is fed to the press zone.

Experiments, which have been conducted, have shown that in case of single-layer presses provided with a spreading device operating with air screening, an increase in efficiency of up to 20% is attained in accordance with the present invention. In other words, heating times are sufficient which range, per mm. of thickness of the chipboard, at about 5.0 - 7.0 seconds.

Since chips of particles for forming chipboards and the like are usually dried prior to the binder-covering step by means of conventional dryers (See German Utility Model No. 7,241,151), it is advantageous in accordance with the present invention to heat the air streams serving for the air screening step by feeding at least part of the exhaust air of such a dryer to the air streams. Exhaust air from such dryers has heretofore been conducted to the outside since the dried components were individually stored intermediately in tanks. Thus, in accordance with the present invention this dryer exhaust air can now be economically exploited.

No difficulties whatever are encountered in heating the air streams serving for the screening step, no matter whether the air streams used for this screening operation are blown only into one or several spreading chambers or are circulated in a cycle (See German Patent No. 1,061,059). In the last-mentioned case, the advantage is attained that it is necessary to connect pipelines to the air conduits of the forming station (i.e. the station in which the chip layer is formed by air screening), which pipelines are fed with dryer exhaust air. To make the heating step more intense, it is even possible to arranged in place of a single blower associated with a forming station two blowers with additional air ducts in superimposed relationship and to supply dryer exhaust air individually to the two air duct arrangements. Dryer exhaust air is available in sufficient quantities.

While the novel principles of the invention have been described, it will be understood that various omissions, modifications and changes in these principles may be made by one skilled in the art without departing from the spirit and scope of the invention.

What is claimed is:

1. In the process for the production of particle boards which comprises:

a. intermixing particles with a heat-curable binder to cover the particles with said binder;
b. air screening the binder-covered particles to deposit a layer of the particles onto a support;
c. transporting the layer of particles into a first press;
d. prepressing the layer of particles within said first press to form a prepressed layer of particles;
e. transporting the prepressed layer of particles to a second press; and
f. pressing the prepressed layer of particles in said second press and heating the layer of particles within said second press to effect curing of said binder whereby the particles are bonded together to form a particle board;

the improvement which comprises heating the air used in (b) for air-screening of the particles to provide more uniform temperature distribution through the thickness of the layer of particles transported to said first and second presses, the maximum temperature of the air being limited to avoid curing of the binder prior to compression of the particles in the first and second presses.

2. The process of claim 1, wherein said particles include fine, extremely fine and coarse particles and the air for air-screening is formed into a plurality of air streams, the improvement further comprising heating the air streams for air screening the fine and extremely fine particles higher than the temperature of the air streams for air-screening the coarse particles.

3. The process of claim 1, wherein said improvement further comprises taking the air used for air-screening said particles from an exhaust of a dryer.

4. In a process for forming a particle board which comprises:

a. intermixing particles with a heat-curable binder to cover the particles with said binder;
b. air-screening the binder-cover particles to deposit a layer of the particles onto a support;
c. transporting the layer of particles to a heated press; and
d. compressing the layer of particles in said press heated to activate said heat-curable binder whereby said particles are bonded together to form the particle board;

the improvement which comprises heating the air used for air-screening the particles in (b) so that the temperature distribution throughout the thickness of the layer of particles is more nearly uniform as the layer is transported into said press; the maximum temperature of the air being limited to avoid curing of the binder prior to compression of the particles in the press.

5. The process of claim 4, wherein said air is formed into a plurality of air streams for air-screening said particles the improvement further comprising heating the air streams to temperatures in the range of from 70°-80° C.

6. The process of claim 4, wherein said improvement further comprises heating said air to a temperature of at least about 70° C.

7. The process of claim 4, wherein said improvement further comprises heating said air to a temperature of about 100° C.

8. The process of claim 4, wherein said improvement further comprises heating said air to a temperature sufficient so that all of the particles in said layer are at a temperature of at least about 50° to 55° C.

9. The process according to claim 4, wherein said particles include fine and coarse particles, the air for air-screening said particles is formed into a plurality of streams, and the coarse particles and the fine particles are separately deposited on said support to form successive strata of fine, coarse and fine particles in said layer by said air-screening, the improvement further comprising heating the air stream for air-screening said fine particles to a temperature higher than the air stream for air-screening said coarse particles.

10. The process of claim 4, wherein said improvement further comprises taking at least a part of the air used for air-screening said particles from an exhasut of a dryer.

* * * * *